April 24, 1956 — N. E. WALKER — 2,743,068
ADJUSTABLE SPOOL TYPE CONTROL FOR MINIATURE AIRPLANE
Filed May 2, 1952
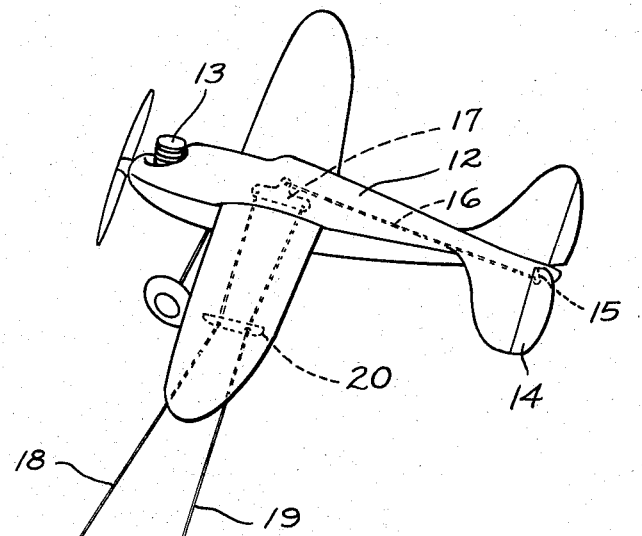
*Fig. 1.*
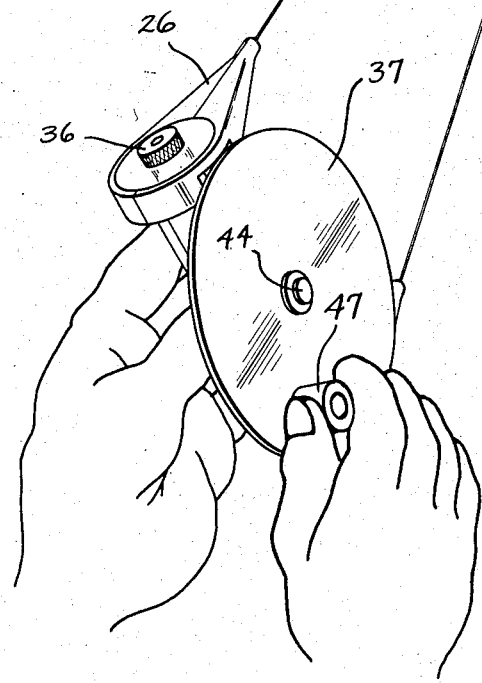
*Fig. 2.*
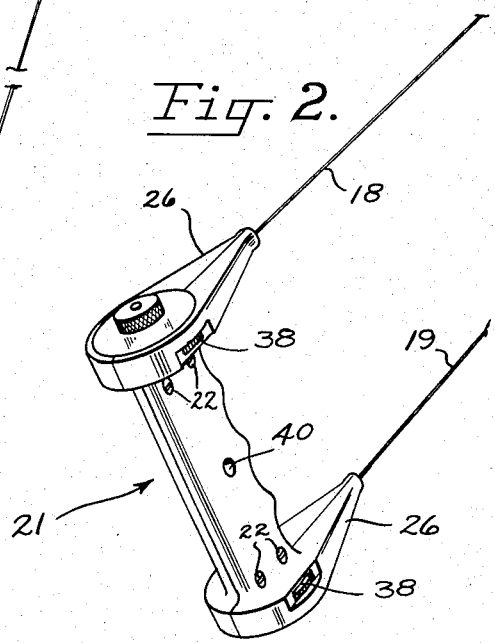
INVENTOR.
Neville E. Walker
BY
Atty.

April 24, 1956   N. E. WALKER   2,743,068
ADJUSTABLE SPOOL TYPE CONTROL FOR MINIATURE AIRPLANE
Filed May 2, 1952   2 Sheets-Sheet 2
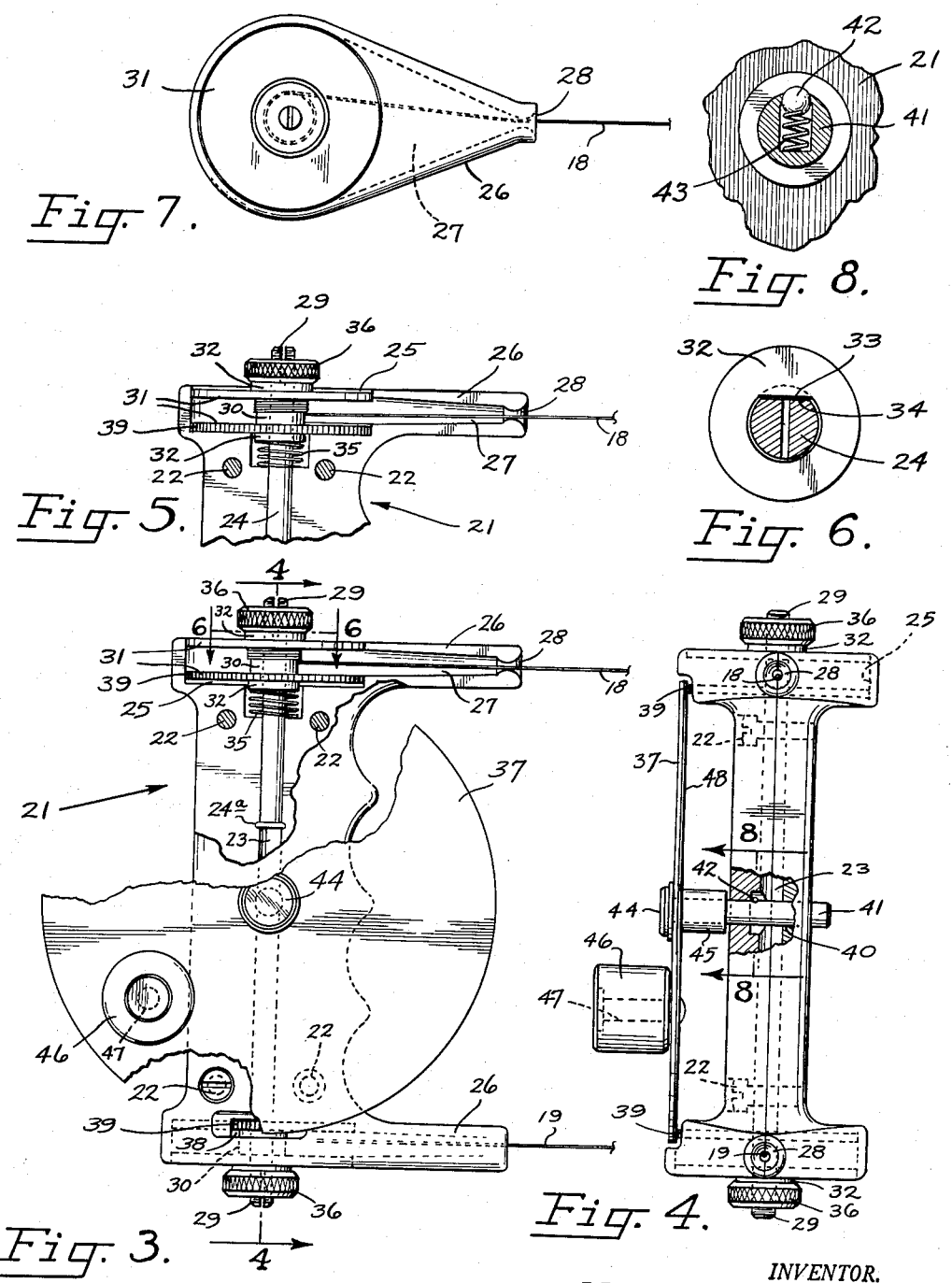
INVENTOR.
Neville E. Walker
BY
Atty.

United States Patent Office 2,743,068
Patented Apr. 24, 1956

2,743,068

ADJUSTABLE SPOOL TYPE CONTROL FOR MINIATURE AIRPLANE

Neville E. Walker, Portland, Oreg., assignor to American Junior Aircraft Company, Portland, Oreg., a corporation of Oregon Application May 2, 1952, Serial No. 285,662

2 Claims. (Cl. 242—99)

My invention relates to a spool type control device for controlling a captive miniature airplane during flight and for storing the control lines therefor when the device is not in use. In particular, the instant invention is an improvement upon my previous invention bearing United States Patent No. 2,406,874 and entitled "Retractable Control Element for Toy Airplanes."

The above noted patent describes the manner in which a self propelled miniature airplane is guided during flight by a pair of retractable control lines held by an operator. These control lines are secured to the elevators or other controls of the airplane so that manipulation of the lines will vary the vertical component of the flight pattern, the horizontal component being varied by reeling in or paying out both control lines at the same time. Thus, the previous invention provides a control handle having a rotatable drum on which the two control lines are wound. One control line is reeved directly about the drum and the other is reeved about an idler pulley or a band so the wires are spaced at the point where they leave the control handle. Thus, the vertical component of the flight pattern is varied by tilting the handle back and forth to shorten one wire with respect to the other and the horizontal component is varied by reeling in or paying out both lines at the same time from the common drum.

The above described control device has proven quite practical in use and has found wide commercial acceptance among miniature airplane enthusiasts. It is not, however, without certain inherent disadvantages, one object of the instant invention being the elimination of these disadvantages so that an improved and more precise control is provided.

One problem which has been met with in controlling the flight of a miniature airplane is that the control wires themselves often tangle up, become kinked, or wind unevenly about the rotatable drum. Thus, each of the two control lines is a piece of braided wire fifty to one hundred feet in length and the winding of this amount of wire on an inch and a half or a three inch spool builds up, layer after layer, much in the manner of a fishing line. As is evident, it virtually is impossible to provide mechanism which will level wind this much wire in the space limitations and within the price range required of a competitive toy. Further, to maintain a coordinated level wind of both wires upon separate portions of the same spool is very difficult. Accordingly, it is one object of the instant invention to provide a separate spool for each of the two control wires and to so correlate the rotation of these spools that the wires, independently, will be guided and level wound while they are reeled in. Thus, tangles, kinks, and uneven winding will be inhibited or eliminated entirely.

A second problem which is encountered in reeling in or paying out the control wires is that one wire often will bunch up or build up on one side of the drum or spool while the other wire is substantially level. Accordingly, an uneven tension is created and the bunched control wire is more likely to slip or give slightly while the airplane is in flight. Such a slip could throw the airplane out of control. To solve this problem, it is another object of my invention to provide a novel friction type drive whereby a single wind up wheel and two spools are correlated so that either spool may slip with respect to the wind up wheel when an increased tension is exerted thereon. In this manner, the control wires initially can be wound with a constant tension and this constant tension will be maintained when the wires later are payed out, set to a constant distance, or reeled in. In end result, a more exact and delicate control of the flight pattern can be effected.

A further object of my invention is to provide a spool type control for a miniature airplane in which an adjustable clutch operatively is joined to one or both of the spools in order that a back pressure or a drag may be exerted upon the control wires when they are unreeled initially and, upon adjustment of the clutch, in order that the spools may be locked tight to permit accurate control of the flight pattern during a contest or exhibition in which the length of wire is required to be kept constant.

To the above ends, my improved control device consists of an elongated body member carrying a flanged spool at either end thereof, these spools being mounted for rotation about a common axis extending longitudinally of the body member. To turn the spools, a wind up wheel is provided, in frictional engagement with the periphery of both spools, and it is an important feature of my invention that this wind up wheel is detachable from the body member proper. Accordingly, when it is desired to effect a flight pattern of preselected radius, the wind up wheel may be removed and put away until such time as further need therefore is evidenced.

As an additional element of the above control device, I provide an adjustable clutch means for at least one of the spool members, said clutch serving selectively to inhibit the rotation of the spool with a preselected amount of drag or to lock the spool or spools against rotation. Further, where two separate clutches are utilized, a differential rotation and/or drag can be effected so that one control wire may be lengthened or shortened with respect to the other. Yet another feature of the instant invention concerns the provision of mechanism for guiding the control wires while they are reeled in. This particular mechanism takes the form of an elongated tapered snout which protrudes radially from the periphery of each spool. Internally, each of these snouts is hollow and a tapered tunnel extends therethrough from the periphery of the spool to a point spaced laterally therefrom, the tunnel itself terminating in a restricted guide aperture. Experience has shown that such a tapered tunnel and guide aperture serve to guide the control wire so that a more level wind up is possible. Accordingly, when the control wire again is unreeled or payed out, a more constant tension will be evident irrespective of the amount of wire utilized to control a particular flight pattern.

In view of the above provisions, it is a further object of my invention to provide a control device for a miniature airplane in which device a single wind up wheel is utilized frictionally to drive two separate spools, said wind up wheel being detachable so that control of the airplane is possible with the wheel removed.

These and other objects and advantages of my invention will be set forth in the following detailed description, taken in conjunction with the accompanying drawings, wherein:

Fig. 1 is a perspective view of my control device with two control wires leading therefrom to a miniature airplane, the control wires being shown broken to shorten the drawing;

Fig. 2 is a perspective view of the control device per se with the wind up wheel removed therefrom, this view illustrating the condition of the device when a flight of constant radius is being effected;

Fig. 3 is a side view, partially broken away, showing the separate spools and their interrelationship with one another and with an adjustable clutch;

Fig. 4 is an end view which is taken substantially on the line 4—4 of Fig. 3 and which partially is broken away to show the manner in which the wind up wheel bears upon the two spools, the detent which maintains the wind up wheel axle in position also being shown in this view;

Fig. 5 is a detail view of one end of the control device showing the adjustable clutch in the locked position whereby rotation of the spool is prevented;

Fig. 6 is a detail view, taken substantially on the line 6—6 of Fig. 3, showing the manner in which the spool shaft is split and a washer is placed thereover to accommodate restricted rotation of a spool relative to the body member;

Fig. 7 is a top view of the control device with the outline of the tapered tunnel and the control wire shown so as to indicate the manner in which the tunnel guides the control wire toward a level wind up; and Fig. 8 is an enlarged detail view, taken substantially on the line 8—8 of Fig. 4, showing the spring biased detent upon the axle of the wind up wheel, this detent serving to position the wind up wheel in preselected frictional engagement with the two spools.

The instant invention is similar to my previous invention in that it is adapted to control a miniature airplane 12 which is self propelled by a motor 13 and is provided with adjustable control surfaces such as the elevators 14. Exemplary control mechanism may include a lever 15, a control rod 16, and a T-shaped operating lever 17, the latter being pivotally mounted on the fuselage of the airplane. The ends of the T-shaped lever 17 are joined to operating lines or wires 18 and 19 having sufficient strength to limit the radius of flight. In turn, the lines 18 and 19 slidably are accommodated in an apertured guide member 20 so that manipulation of one line with respect to the other will effect a control of the elevators 14. In essence, the mechanism thus far described is the same as that described in my previous United States Patents 2,292,416 and 2,406,874.

Turning now to the novel elements of the instant invention, I provide an elongated body member 21 which defines a fingers around hand grip portion. One preferred method of forming this body member 21 is to cast two separate pieces from plastic and to secure these pieces together as with cap screws 22. Such a simplicity of fabrication allows the device to be sold at a reduced cost and allows the ultimate purchaser easily to disassemble the parts when lubrication or repair is required.

Referring to Fig. 3, it will be seen that the body member is pierced by a hollow tunnel 23 which opens to both ends thereof. Identical stub shafts 24 are mounted within and protrude from each end of this tunnel 23, the inner ends of these shafts being fixed against longitudinal movement by flanges 24a. Further, each end of the body member 21 bounds a laterally extending circular recess 25 and is provided with a tapered snout 26 which protrudes radially from the periphery of the corresponding circular recess 25. As indicated in Figs. 3, 5 and 7, each of the tapered snouts 26 is hollow and is provided with a tapered tunnel 27 which terminates in a restricted guide aperture 28. Thus, accommodation is made for a spool and for the line or wire which is carried thereby.

In order to accommodate a securing mechanism, I prefer to split the protruding end of each stub shaft 24 and to form screw threads 29 thereon (see Figs. 3 and 6).

Additionally, a spool 30 having flanges 31 rotatably is fitted over each of the stub shafts 24 (on the unthreaded portion thereof) within the corresponding circular recess 25. The two spools 30 are mounted for rotation about a common longitudinal axis which coincides with the axis of the tunnel 23 so that a common actuation member may be provided therefor as hereinafter will be described.

Continuing with the details of each spool mounting, a spacer or washer 32 abuts each of the flanges 31, the outer of these washers having a protruding flat portion 33 which is mated to a slabbed off portion 34 of the stub shaft. The protrusion 33 and slabbed off portion 34 prevent rotation of the outer washer 32 relative to the body member and the spool. Further, as best shown in Fig. 5, a compression spring 35 is interposed between the body member 21 and the washer 32 on the inner side of each spool. On the outer side of the spool 30, a knurled nut 36 is threaded upon the screw threads 29 for abutment with the outer washer 32.

In function, the last described elements define an adjustable clutch means which selectively will fix each of the spools against rotation relative to the shaft 24 or will accommodate such rotation with a preselected amount of drag. Thus, Fig. 3 indicates the position of the parts in which a slight "drag" or holding force is exerted by the clutch elements and Fig. 5 indicates a "locked" or holding position of these same elements. In the latter figure, it will be noted that the knurled nut 36 has been tightened upon the screw threads 29 and the inner flange 31 thereby has been brought into direct frictional abutment with the body member 21 so as to prevent rotation of the spool in definition of the locked position. In Fig. 3, on the other hand, the knurled nut 36 has been backed off and only a slight frictional rubbing contact, caused by the coaction of the compressed spring 35 and the nut, is exerted upon the flanges 31 of the spool. Thus, when the control wire 18 is unwound with the clutch parts in this latter position, the spool will not overrun and backlash will not develop yet a slight pull is sufficient to rotate the spool. This drag and the elements creating the same are lacking in my previous invention yet they are of substantial utility in preventing tangling and bunching of the control wire. Accordingly, they are an important feature of the instant invention.

In order to provide a novel drive mechanism for the two spools 30 whereby the tension of the two lines 18 and 19 is maintained constant as the lines are reeled in or payed out, I provide a disk-like friction drive, wind up wheel 37. As shown in Figs. 2, 3 and 4, this wind up wheel cooperates with one flange on each of the spools 30. Thus, the ends of the body member 21 are flared out to encompass the peripheries of the spool members 30 and a lateral opening 38 pierces these flared portions so that a complementary portion of one of the flanges 31 protrudes therethrough. Additionally, the periphery of that spool flange which protrudes through the opening 38 may be milled or otherwise roughened, as indicated at 39, to accommodate the desired friction type drive.

In Fig. 2, the wind up wheel 37 has been detached from the body member 21 so that a lateral receiving aperture 40 is exposed to view. This receiving aperture 40 is adapted frictionally to carry an axle member 41 (see Fig. 4). Thus, as the detail of Fig. 8 indicates, the axle member 41 is provided with a ball detent 42 having a compression spring 43 bearing thereon. When the axle member 41 is inserted within the receiving aperture 40, the detent 42 snaps into place so as to position the wind up wheel 37 in an exact location with respect to the flanges on both spools and define a snap type quick detachment means. That is to say, the axle 41 terminates in an enlarged head 44 and the wind up wheel 37 carries an encompassing collar 45. In total, these elements function as a journal bearing so the wind up wheel 37 may rotate relative to the axle 41. Further, the wind up wheel 37 carries a gripping knob 46 which is rotatably mounted, as at 47, to allow the wheel to be turned.

As previously explained with reference to Figs. 2 and 4, the wind up wheel 37 is detachable with respect to the remainder of the control device, such detachment being accommodated by the detent 42. Accordingly, when it is desired to reel in the control lines 18 and 19, the axle 41 and wind up wheel 47 are snapped into place within the receiving aperture 40. Such a positioning of the parts brings the flat inner face of the wind up wheel 37 into frictional abutment with the protruding peripheries of one flange 31 on each of the spools (see Fig. 4). Further to enhance this frictional engagement, a coating or covering of rubber or the like 48 may be applied over the contact face of the wind up wheel 37. Thereafter, the control lines 18 and 19 may be reeled in by grasping the knob 46 and rotating the wind up wheel. As is to be expected, rotation of the wind up wheel frictionally will drive the two spools 30 by virtue of the contact between the milled or roughened surface 39 of the flange periphery and the rubber or equivalent coating or cover 48 on the inner face of the wind up wheel. An important feature of my invention which is not too apparent from a cursory examination of the drawings concerns the friction type drive for the spools. Thus, it sometimes happens during the reeling in of the control lines 18 and 19 that one line will level wind whereas the other will bunch up or build up on one side of the spool or the other. Should this contingency occur with the instant device, the unequal tension thereby evidenced in the lines 18 and 19 automatically will be corrected by the friction type drive. Thus, if the line 18 winds up or builds up on one side of the spool 30, each turn of that spool will attempt to wind a greater lineal length of the line than a corresponding single turn of the spool carrying the line 19. Accordingly, the tension upon the line 18 will be increased. At the same time, it will be evident that the wind up wheel 37 is arranged to turn both spools at the same rate. However, with the instant invention, too great a tension on one spool relative to the other will cause that spool to slip as the wind up wheel 37 is rotated. In the above example, the spool carrying the line 18 will slip somewhat while the spool carrying the line 19 will continue to rotate. This slippage will continue until the tension upon the two spools substantially is equal, at which time both spools will rotate at equal speeds once again.

In operation, let it be assumed that the control lines 18 and 19 are completely reeled in upon the spools 30. If then it is desired to fly a miniature airplane such as that shown at 12, the wind up wheel 37 need not be attached. Instead, the wind up wheel may be kept in the pocket of the operator while the body member 21 is held by the hand grip portion thereof. Thereafter, the two knurled nuts 36 are backed off so as to loosen the clutch mechanisms, yet so as to retain a slight frictional drag upon the two spools 30. A second individual then either grasps the control lines 18 and 19 and walks away from the operator or the control lines first are attached to the airplane 12 and the airplane itself is walked away. When the proper amount of control line has been unreeled, the clutch mechanisms are tightened so as to lock the spools relative to the body member. Thereafter, the airplane can be flown and control thereof effected by rocking the wrist back and forth to exert more or less pressure upon one control line relative to the other.

As noted in my previous Patent 2,406,874, the control lines may be shortened or lengthened during flight if such is desired. In that event, or in the event that the airplane is landed and it is desired to reel in the control lines 18 and 19, the wind up wheel must be attached. Such attachment is effected by snapping the axle 41 into place, the detent 42 serving to position the parts, and the flat inner face of the wind up wheel 37 contacts the protruding flange portions 31 of the spools. Thereafter, rotation of the wind up wheel 37 can be effected after the clutch mechanisms are loosened. However, in accord with the previously mentioned important feature of my invention, an uneven winding of the control wires is inhibited by the restricted guide aperture 28 and tapered tunnel 27. At the same time, if one control line does inadvertently bunch up or wind unevenly, the wind up wheel 37 will slip somewhat with respect to the flange of that spool until the tensions upon the two wires substantially are equivalent. In this manner, succeeding flights of the airplane 12, whether made with a similar amount of control wire unreeled or with less or with more control wire all can be effected with precise and accurate control. That is to say, the tension upon the two control lines 18 and 19 will be equal irrespective of the amount of line utilized in a given flight.

As a result of the separate mounting of the two shafts 24 and spools 30, another feature of my invention is evidenced. Thus, prior to or after flight, it sometimes may be necessary to adjust the length of one control line with respect to the other. Such adjustment is effected with the instant invention merely by backing off one of the knurled nuts 36 so as to permit unwinding thereof a slight amount while the other spool is retained in locked position. After adjustment, the knurled nut once again may be tightened or the control lines may be reeled in equal amounts by utilizing the wind up wheel 37.

In summary, it will be seen that I have provided a spool type control device in which a novel friction type drive is utilized to rotate two independently mounted spools. With this novel drive, the control wires initially can be wound in with a constant tension irrespective of whether the individual wires build up on one side of a spool or are level wound. Further, I have provided separate adjustable clutches for the two spools in order that a back pressure or a drag may be exerted upon the control wires or the spools may be locked tight to permit accurate control of the flight pattern during a contest or an exhibition. Still further, I have provided a wind up wheel which is removable and detachable while a miniature airplane is flown in a constant radius, said detachment permitting control to be made with a lighter, more delicate touch since the device then is not encumbered by elements not in use. In function then, the wind up wheel defines a means common to both spools for rotating the same simultaneously and equally in opposite directions.

I claim:

1. In a spool type control for a miniature airplane, an elongated hollow body member defining a fingers around hand grip centrally and bounding, at each end thereof, a laterally extending circular recess, each end of said body member having a radially protruding tapered snout, each said snout having a tapered tunnel extending therethrough and communicating with the corresponding circular recess, a spool member carried within each circular recess, said spool members being mounted for rotation about a common axis extending longitudinally of said body member, means for rotating said spool members, an adjustable clutch means operatively connected with at least one of said spool members selectively to inhibit the rotation thereof with a preselected amount of drag or to lock the same against rotation, and an elongated wire wound about each said spool and reeved through the tapered tunnel corresponding thereto.

2. A distant control for a miniature airplane, comprising an elongated body member defining a hand grip portion and having a hollow tunnel opening longitudinally in from the ends thereof, a stub shaft mounted within and protruding from each end of said tunnel, a spool member mounted upon the protruding portion of each stub shaft for rotation about a longitudinal axis coinciding with the axis of said hollow tunnel, means for rotating said spool members, an adjustable clutch means interconnecting each spool member and the corresponding stub shaft selectively to fix the spool against rotation relative to the shaft and to accommodate such relative rotation with a preselected amount of drag, an elongated tapered snout protruding laterally from each end of said body member from adjacent the periphery of a corresponding one of said spool members, each said snout bounding and encompassing a tapered tunnel which narrows from a wide lateral width adjacent the spool periphery to a narrow guide aperture adjacent the protruding end of the snout, and an elongated wire wound about each spool member and reeved out through the corresponding hollow tunnel and narrow guide aperture for joinder to a miniature airplane.

References Cited in the file of this patent

UNITED STATES PATENTS

| | | |
|---|---|---|
| 415,897 | Bradner | Nov. 26, 1889 |
| 881,772 | Canney | Mar. 10, 1908 |
| 1,877,440 | Adatte | Sept. 13, 1932 |
| 2,406,874 | Walker | Sept. 3, 1946 |
| 2,536,875 | Dalrymple | Jan. 2, 1951 |
| 2,601,409 | McArthur et al. | June 24, 1952 |
| 2,656,991 | Neely | Oct. 27, 1953 |